June 5, 1934.  F. BROEMME ET AL  1,961,604
DRILL AND ATTACHMENT THEREFOR
Filed July 20, 1932
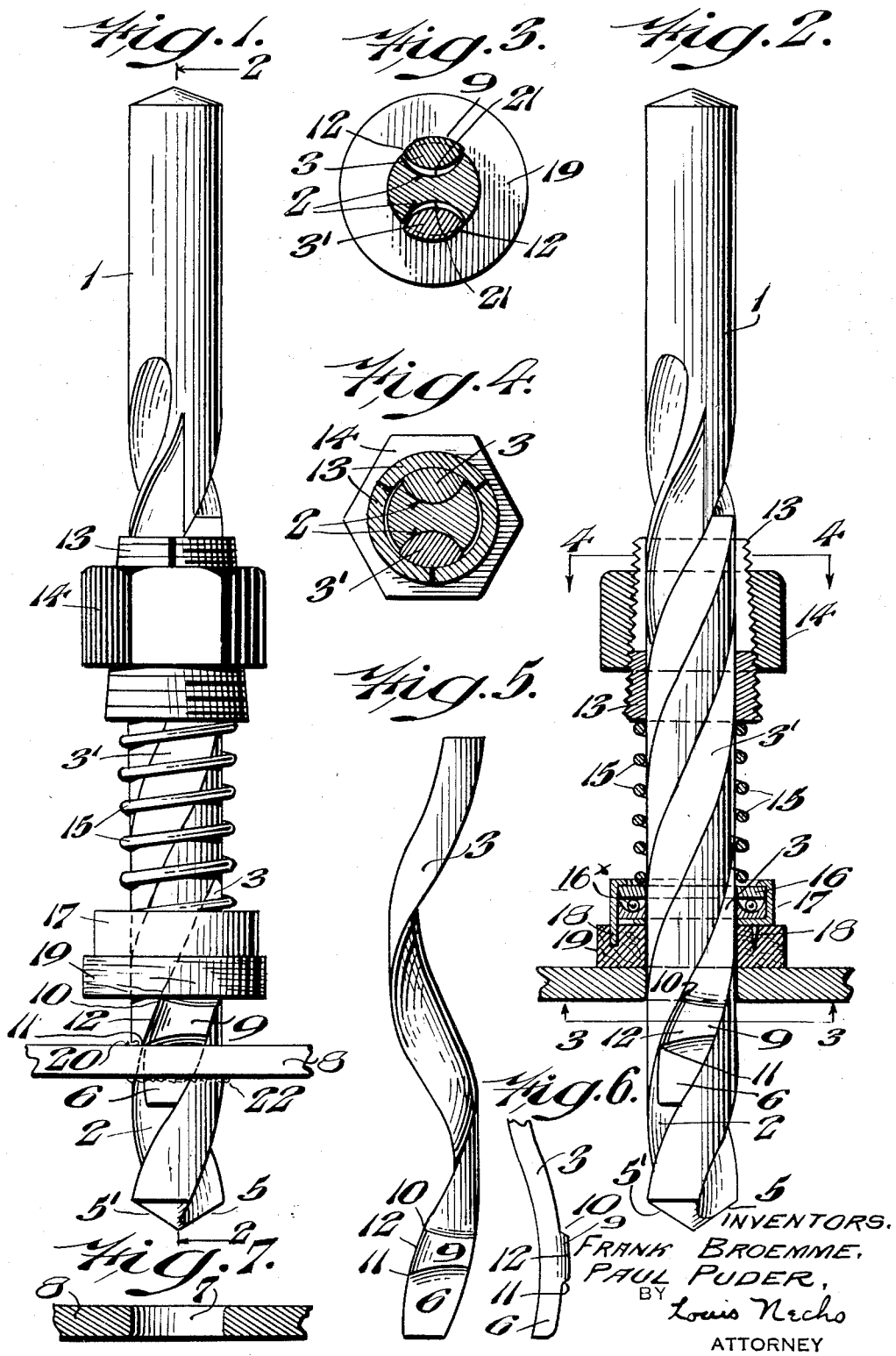
INVENTORS.
FRANK BROEMME,
PAUL PUDER,
BY Louis Necho
ATTORNEY Patented June 5, 1934

1,961,604

UNITED STATES PATENT OFFICE 1,961,604

DRILL AND ATTACHMENT THEREFOR

Frank Broemme, Palmyra, and Paul Puder, Riverton, N. J.

Application July 20, 1932, Serial No. 623,502

4 Claims. (Cl. 77—66)

Our invention relates to a new and useful drill and it relates more particularly to a drill provided with means for cutting a finished hole through any given stock, that is one which simultaneously with the drilling of a hole through said stock will automatically remove the burs which are always formed at the opposite rims or edges of the hole drilled through said stock, thereby eliminating the necessity of a subsequent smoothing or finishing operation which has heretofore been necessary.

Our invention further relates to an attachment which may be applied to any form of conventional twist drill without any material interference with or alteration of the conventional standard construction of such twist drill.

Our invention still further relates to a device of this character which is extremely inexpensive to manufacture, one which is very easily applied to a conventional drill, and one which is entirely automatic in its operation so as to need no particular attention on the part of the person using the drill.

In the accompanying drawing;

Fig. 1 represents a front elevation of a drill embodying our invention shown prior to entering the stock.

Fig. 2 represents a partial section on line 2—2 of Fig. 1 showing the drill after passing through the stock.

Fig. 3 represents a section on line 3—3 of Fig. 2, certain parts being omitted.

Fig. 4 represents a sectional view similar to Fig. 3 showing the position of the parts during the passage of the drill through the stock being drilled.

Fig. 5 represents a front elevation of the attachment embodying our invention.

Fig. 6 represents a fragmentary side elevation of the lower portion of the attachment shown in Fig. 5.

Fig. 7 represents a sectional view of the stock after a hole has been drilled therethrough.

Referring to the drawing in which like reference characters indicate like parts, 1 represents a conventional twist drill having the elongated spirally extending cutting or drilling elements 4 which are interspaced by the corresponding grooves 2 in the usual manner. While we have illustrated a drill having two cutting or drilling elements 4 interspaced with two grooves, it is to be understood that our invention as hereinafter described is equally applicable to drills of this kind regardless of the number of grooves and drilling elements thereof and regardless of whether such drills are of a constant or varying and non-uniform twist. In the grooves 2 of the drill 1 are adapted to lie the twisted or spiral blades 3, the number of blades 3 used depending upon the number of grooves 2 and cutting or drilling members 4. The blades 3 are somewhat shorter than the grooves 2 in which they lie and each of the blades terminates in a bottom pilot member 6 which as shown in Figure 1 is somewhat short of the bottom cutting ends or edges 5 of the drill members 4, the bottom edge of the pilot member 6 being blunt or non-cutting. At a point just above the pilot member 6 is an enlarged segment 9 having the upper and lower sharp cutting edges 10 and 11 and having the blunt, rounded edges 12. The blades 3 are held in position in the fluted grooves 2 by any suitable chuck 13 engaged by a nut 14, said blades being further guided and retained in the grooves 2 by the spring 15 coiled thereabout, which spring is confined between the bottom edge of the chuck 13 and the collar 16. Over the collar 16 is fitted the loosely rotatable sleeve 17 which is provided at the bottom thereof with the pins 18 which engage any suitable washer or bearing member 19. Intermediate the collar 16 and sleeve 17 I position any suitable anti-friction means 16x.

The operation is as follows: When it is desired to drill a hole 7 in the stock 8, the cutting edges 5 of the drill members 4 are applied to the upper surface of the stock and the drill is turned by any suitable means. As the drilling members 4 advance through the stock a burr 22 forms on the upper edge of the stock and when the cutting edges 5 and drilling members 4 have passed through the stock another burr 22 forms on the bottom edge of the stock 8, the burr referred to being shown only at the bottom of the stock in Figure 1. As the drill members 4 advance through the stock, the pilots 6 which are tapered at their lower edges, as seen in Figure 1, and which are formed at the bottom of the blades 3, guide the blades 3 into the hole 7. This brings the bottom cutting edge 11 of the enlarged segment 9 into contact with the burr formed on the upper surface of the stock, and as the blades 3 rotate with the drills the sharp edges 11 of the enlarged segments 9 serve to cut or eliminate the burr, thus producing the nicely rounded upper edge of the hole 7, as shown in Figure 7. As the drill members 4 and their bottom cutting edges 5 pass further through the stock 8, and when the upper cutting edges 10 of the enlarged segments 9 on the blades 3 have cleared the bottom edge of the hole 7, the spring 15 is compressed between the washer 16 and the bottom edge of the chuck 13, and the lower ends of the blades 3 freed from the action of the spring 15 tend to flare outwardly from the vertical axis of said drill, thus bringing the upper cutting edges 10 of the enlarged segments 9 during the return movement of the drill, into contact with the burr 22 on the bottom edge of the hole 7 to round or remove said burr to produce the hole shown in Figure 7. In order to enable the enlarged segment 9 to pass through the hole 7, which is of a slightly smaller diameter since it is cut by the drill members 4, beyond the vertical lines of which the enlarged segment 9 somewhat projects, the clearance 21 is provided between the blades 3 in the body of the drill by making the blades 3 somewhat smaller than the grooves 2. As shown in Figure 3, the blades 3 are not compressed, the clearance 21 is visible, and the edges 12 of the segments 9 project beyond the circumference of the drill proper. In Figure 4 the drill is shown in the stock with the blades 3 compressed fully in the grooves 2 and the edges 12 of the segments 9 contained within the circumference of the drill proper. This results only after the bottom edge 11 of the segment 9 has removed the upper burr and lasts until the upper edge 10 of the segment 9 has cleared the bottom edge of the hole 7, whereupon the springy character of the blades 3 will at once project the enlarged segment 9 radially below the hole 7 and the action of the spring 15 which pulls up on the drill will serve to bring the cutting edge 10 of the segment 9 into contact with the bottom burr 22. It will thus be seen that by merely providing the blades 3 having the enlarged segments 9 with the upper and lower cutting edges 10 and 11 and the pilot section 6 to a conventional twist drill 1 we make provision for removing the burr formed on either side of a hole drilled in a stock by means of a drill simultaneously with the cutting of the hole without any skill or attention on the part of the operator. It will also be seen that the construction we have devised is very inexpensive to manufacture, that it can be assembled without any skill and with a minimum of time and effort, and that it does not interfere with the standard construction of a conventional drill of this type.

Having thus described our invention, we claim as new and desire to secure by Letters Patent:

1. A twist drill, comprising drilling members interspaced with grooves, resilient, normally outwardly bowed strips secured at their upper ends to said drilling members and adapted to lie in said grooves, radially projecting members formed on said strips near the lower ends thereof, and cutting elements formed on said projections, said strips being of lesser dimensions than said grooves, whereby said projections may be compressed to lie within the circumferential plane of said drill.

2. A drill comprising drilling members interspaced with grooves, auxiliary resilient, normally outwardly bowed strips adapted to lie in said grooves, means for securing the upper ends of said strips to said drill, and transversely projecting cutting edges near the free ends of said strips in proximity to the effective ends of said drilling members, the lower of said cutting edges being adapted to remove the burr from the upper side of a hole drilled by said drilling members and the upper of said cutting edges being adapted to remove the burr from the lower side of said hole.

3. A drill comprising drilling members interspaced with grooves, auxiliary resilient, normally outwardly bowed strips adapted to lie in said grooves, means for securing the upper ends of said strips to said drill, and normally, radially projecting, transversely disposed cutting elements on said strips near the free ends thereof, the lower of said cutting edges being adapted to remove the burr from the upper side of a hole being cut in a stock by said drill and the upper of said cutting edges being adapted to remove the burr from the lower side of said hole, said normally projecting cutting edges being adapted to be compressed into an inoperative position within the circumference of said drill during the passage of said cutting elements through said stock.

4. An attachment for a twist drill having spirally extending drilling members interspaced with corresponding spiral grooves, comprising a resilient, normally outwardly bowed spiral strip adapted to lie in one of said grooves, means for securing the upper end of said strip to said drill, a projection formed on said strip near one end thereof, a plurality of spaced, transversely disposed cutting edges formed on said projection, whereby the lower of said cutting edges is made to act on the upper side of a hole formed by said drill, and the upper of said cutting edges is made to act on the lower side of a hole formed by said drilling members after the passage through said hole of said projection.

FRANK BROEMME.
PAUL PUDER.